United States Patent [19]
Miller

[11] 3,779,737
[45] Dec. 18, 1973

[54] 2-(THIADIAZOLYL)-1,2,4-THIADIAZOLIDINE-3-5 DIONES AND 1-(THIADIAZOLYL)-1,3-DIAZOLIDINE-2,4,5-TRIONES AS HERBICIDES (AG-80)

[75] Inventor: Alfred H. Miller, Somerset, N.J.

[73] Assignee: Esso, Research and Engineering Company, Linden, N.J.

[22] Filed: Nov. 23, 1971

[21] Appl. No.: 201,565

Related U.S. Application Data

[62] Division of Ser. No. 32,463, April 27, 1970, Pat. No. 3,651,075.

[52] U.S. Cl. .................................................. 71/90
[51] Int. Cl. ............................................. A01n 9/22
[58] Field of Search .......................................... 71/90

[56]  References Cited
UNITED STATES PATENTS
3,657,264   4/1972   Rucker et al. .................. 260/306.8

*Primary Examiner*—Lewis Gotts
*Assistant Examiner*—Catherine L. Mills
*Attorney*—John Paul Corcoran

[57]  ABSTRACT

Compositions of matter characterized by the following structural formula:

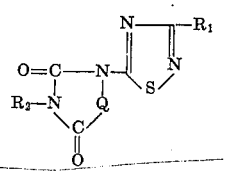

wherein $R_2$ can be one selected from the group consisting of hydrogen, $C_1$-$C_8$ alkyl, $C_3$-$C_8$ cycloalkyl, $C_7$-$C_{10}$ aralkyl, $C_1$-$C_4$ dialkyl amino, $C_6$-$C_{10}$ aryl optionally substituted by $C_1$-$C_4$ alkyl, $C_3$-$C_8$ alkene, $C_3H_8$ alkyne, chlorine, bromine or nitro; $R_1$ can be the same or different as $R_2$, and can also include $C_1$-$C_4$ alkylmercapto; and Q is one selected from the group consisting of C=O and S, have been shown to possess pesticidal activity especially pre- and post-emergent herbicidal activity.

17 Claims, No Drawings

2-(THIADIAZOLYL)-1,2,4-THIADIAZOLIDINE-3-5 DIONES AND 1-(THIADIAZOLYL)-1,3-DIAZOLIDINE-2,4,5-TRIONES AS HERBICIDES (AG-80)

This is a division of application Ser. No. 32,463, filed on Apr. 27, 1970, now U.S. Pat. No. 3,651,075. This invention relates to novel compositions of matter possessing pesticidal activity. In one aspect, this invention relates to compositions of matter containing the 1,2,4-thiadiazolyl moiety which have been found to possess utility as novel selective herbicides, both pre- and post-emergent.

In a copending application bearing Ser. No. 870,475, filed Oct. 22, 1969, there is described novel herbicidal compositions which are related to ureas containing the 1,2,4-thiadiazolyl group. The subject invention differs from those compounds disclosed in the above-identified patent application in that the 1,2,4-thiadiazolyl group is attached to a closed heterocyclic ring system.

The novel compositions of the subject invention can be characterized by the following structure:

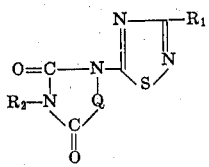

wherein $R_2$ can be one selected from the group consisting of hydrogen, $C_1$-$C_8$ alkyl, $C_3$-$C_8$ cycloalkyl, $C_7$-$C_{10}$ aralkyl, $C_1$-$C_4$ dialkyl amino, $C_6$-$C_{10}$ aryl optionally substituted by $C_1$-$C_4$ alkyl, $C_3$-$C_8$ alkene, $C_3H_8$ alkyne, chlorine, bromine or nitro; $R_1$ can be the same or different as $R_2$, and can also include $C_1$-$C_4$ alkylmercapto; and Q is one selected from the group consisting of C=O and S.

Exemplary of compounds which are encompassed by the above structural formula are the following:

Compound No.
1. 2-(1,2,4,-thiadiazolyl)-4-methyl-1,2,4-thiadiazolidine 3-5-dione
2. 2-(3-methyl-1,2,4-thiadiazolyl)-4-methyl-1,2,4,-thiadiazolidine 3-5-dione
3. 2-(3-ethyl-1,2,4-thiadiazolyl)-4-methyl-1,2,4-thiadiazolidine 3-5-dione
4. 2-(3propyl-1,2,4-thiadiazolyl)-4-methyl-1,2,4-thiadiazolidine 3-5-dione
5. 2-(3-isopropyl-1,2,4-thiadiazolyl)-4-methyl-1,2,4-thiadiazolidine 3-5-dione
6. 2-(3-butyl-1,2,4-thiadiazolyl)-4-methyl-1,2,4-thiadiazolidine 3-5-dione
7. 2-(3-isobutyl-1,2,4-thiadiazolyl)-4-methyl-1,2,4-thiadiazolidine 3-5-dione
8. 2-(3-t-butyl-1,2,4-thiadiazolyl)-4-methyl-1,2,4-thiadiazolidine 3-5-dione
9. 2-(3-n-pentyl-1,2,4-thiadiazolyl)-4-methyl-1,2,4-thiadiazolidine 3-5-dione
10. 2-(3-isopentyl-1,2,4-thiadiazolyl)-4-methyl-1,2,4-thiadiazolidine 3-5-dione
11. 2-(3-neopentyl-1,2,4-thiadiazolyl)-4-methyl-1,2,4-thiadiazolidine 3-5-dione
12. 2-(3-n-hexyl-1,2,4-thiadiazolyl)-4-methyl-1,2,4-thiadiazolidine 3-5-dione
13. 2-(3-cyclopropyl-1,2,4-thiadiazolyl)-4-1,2,4-thiadiazolidine 3-5-dione
14. 2-(3-cyclobutyl-1,2,4-thiadiazolyl)-4-methyl-1,2,4-thiadiazolidine 3-5-dione
15. 2-(3-cyclopentyl-1,2,4-thiadiazolyl)-4-methyl-1,2,4-thiadiazolidine 3-5-dione
16. 2-(3-cyclohexyl-1,2,4-thiadiazolyl)-4-methyl-1,2,4-thiadiazolidine 3-5-dione
17. 2-(3-trichloromethyl-1,2,4-thiadiazolyl)-4-methyl-1,2,4-thiadiazolidine 3-5-dione
18. 2-(3-thiomethyl-1,2,4-thiadiazolyl)-4-methyl-1,2,4-thiadiazolidine 3-5-dione
19. 2-(3-chloro-1,2,4-thiadiazolyl)-4-methyl-1,2,4-thiadiazolidine 3-5-dione
20. 2-(3-phenyl-1,2,4-thiadiazolyl)-4-methyl-1,2,4-thiadiazolidine 3-5-dione
21. 2-(3-methoxy-1,2,4-thiadiazolyl)-4-methyl-1,2,4-thiadiazolidine 3-5-dione
22. 2-(3-benzyl-1,2,4-thiadiazolyl)-4-methyl-1,2,4-thiadiazolidine 3-5-dione
23. 2-(3-cycloheptyl-1,2,4-thiadiazolyl)-4-methyl-1,2,4-thiadiazolidine 3-5-dione
24. 2-(3-p-chlorophenyl-1,2,4-thiadiazolyl)-4-methyl-1,2,4-thiadiazolidine 3-5-dione
25. 2-(3-o,p-dichlorophenyl-1,2,4-thiadiazolyl)-4-methyl-1,2,4-thiadiazolidine 3-5dione
26. 2-(3-n-heptyl-1,2,4-thiadiazolyl)-4-methyl-1,2,4-thiadiazolidine 3-5-dione
27. 2-(3-n-octyl-1,2,4-thiadiazolyl)-4-methyl-1,2,4-thiadiazolidine 3-5-dione
28. 2-(3-dimethylamino-1,2,4-thiadiazolyl)-4-methyl-1,2,4-thiadiazolidine 3-5-dione
29. 2-(3-p-nitrophenyl-1,2,4-thiadiazolyl)-4-methyl-1,2,4-thiadiazolidine 3-5-dione
30. 2-(3-thioisopropyl-1,2,4-thiadiazolyl)-4-methyl-1,2,4-thiadiazolidine 3- 5-dione
31. 2-(1,2,4-thiadiazolyl)-4-ethyl-1,2,4-thiadiazolidine 3-5-dione
32. 2--(3-methyl-1,2,4-thiadiazolyl)-4-propyl-1,2,4-thiadiazolidine 3-5-dione
33. 2-(3-ethyl-1,2,4-thiadiazolyl-4-i-propyl-1,2,4-thiadiazolidine 3-5-dione
34. 2-(3-propyl-1,2,4-thiadiazolyl)-4-ethyl-1,2,4-thiadiazolidine 3-5dione
35. 2-(3-isopropyl-1,2,4-thiadiazolyl)-4-phenyl-1,2,4-thiadiazolidine 3-5-dione
36. 2-(3-butyl-1,2,4-thiadiazolyl)-4-dimethylamino-1,2,4-thiadiazolidine 3-5-dione
37. 2-(3-isobutyl-1,2,4-thiadiazoyl)-4-propyl-1,2,4-thiadiazolidine 3-5-dione
38. 2-(3-t-butyl-1,2,4-thiadiazolyl)-4-methyl-1,2,4-thiadiazolidine 3-5-dione
39. 2-(3-n-pentyl-1,2,4-thiadiazolyl)-4-methoxy-1,2,4-thiadiazolidine 3-5-dione
40. 2-(3-isopentyl-1,2,4-thiadiazolyl)-4-ethyl-1,2,4-thiadiazolidine 3-5-dione
41. 2-(3-neopentyl-1,2,4-thiadiazolyl)-4-methoxy-1,2,4-thiadiazolidine 3-5-dione
42. 2-(3-n-hexyl-1,2,4-thiadiazolyl)-4-phenyl-1,2,4-thiadiazolidine 3-5-dione
43. 2-(3-cyclopropyl-1,2,4-thiadiazolyl)-4-i-propyl-1,2,4-thiadiazolidine 3-5-dione
44. 2-(3-cyclobutyl-1,2,4-thiadiazolyl)-3-cyclopropyl-1,2,4-thiadiazolidine 3-5-dione
45. 2-(3-cyclopentyl-1,2,4-thiadiazolyl)-3-i-propyl-1,2,4-thiadiazolidine 3-5-dione
46. 1-(1,2,4-thiadiazolyl)-3-methyl-1,3-diazolidine-2,4,5-trione
47. 1-(3-methyl-1,2,4-thiadiazolyl)-3-methyl-1,3-diazolidine-2,4,5-trione
48. 1-(3-isopropyl-1,2,4-thiadiazolyl)-3-methyl-1,3-diazolidine-2,4,5-trione
49. 1-(3-isopentyl-1,2,4-thiadiazolyl)-3-methyl-1,3,-diazolidine-2,4,5-trione
50. 1-(3-pentyl-1,2,4-thiadiazolyl)-3-methyl-1,3-diazolidine-2,4,5-trione
51. 1-(3-octyl-1,2,4-thiadiazolyl)-3-methyl-1,3-diazolidine-2,4,5-trione
52. 1-(3-trichloromethyl-1,2,4-thiadiazolyl)-3-methyl-1,3-diazolidine-2,4,5-trione
53. 1-(3-phenyl-1,2,4-thiadiazolyl)-3-methyl-1,3-diazolidine-2,4,5-trione
54. 1-(3-cyclopropyl-1,2,4-thiadiazolyl)-3-methyl-1,3-diazolidine-2,4,5-trione
55. 1-(3-benzyl-1,2,4-thiadiazolyl)-3-methyl-1,3-diazolidine-2,4,5-trione
56. 1-(3-cyclohexyl-1,2,4-thiadiazolyl)-3-methyl-1,3-diazolidine-2,4,5-trione
57. 1-(3-methyl-1,2,4-thiadiazolyl)-3-propyl-1,3-diazolidine-2,4,5-trione
58. 1-(3-n-pentyl-1,2,4-thiadiazolyl)-3-isoproypyl-1,3-diazolidine-2,4,5-rione
59. 1-(3-isopentyl-1,2,4-thiadiazolyl)-3phenyl-1,3-diazolidine-2,4,5-trione
60. 1-(3-hexyl-1,2,4-thiadiazolyl)-3-dimethylamino-1,3-diazolidine-2,4,5-trione
61. 1-(3-isopentyl-1,2,4-thiadiazolyl)-3-cyclopropyl-1,3-diazolidine-2,4,5trione
62. 1-(3-isopentyl-1,2,4-thiadiazolyl)-3-methoxy-1,3-diazolidine-2,4,5-trione
63. 1-(3-octyl-1,2,4-thiadiazolyl)-3-propyl-1,3-diazolidine-2,4,5-trione Compounds in which Q=S can be readily prepared by the following method (Scheme A):

Scheme A

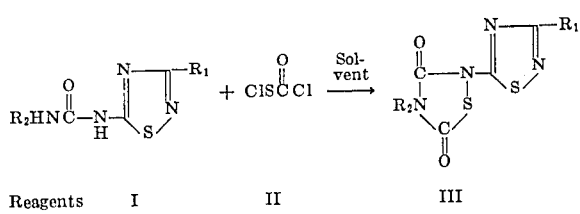

Reagents  I  II  III

The above reaction can be carried out at a temperature ranging from 25° 150° C., preferred 70° to 90° C., in a solvent such as benzene, toluene, xylene, ligroin, dimethylformamide, dioxane, chlorobenzene and at a molar ratio of I:II ranging from 1:1 to 1:5, preferably 1:1. The preferred solvents for conducting this reaction are benzene, toluene or chlorobenzene.

Compounds in which $Q = C = O$ can be readily prepared by the following method (Scheme B):

Scheme B:

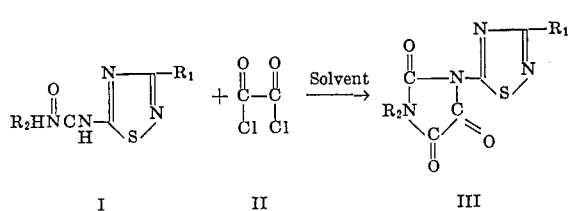

I  II  III

The conditions such as molar ratios, solvents and temperatures can be the same as set forth hereinabove in Scheme A.

Ureas containing the 1,2,4-thiadiazolyl group are precursors to forming the compounds of the subject invention. The preparation of these ureas is set forth in the above-identified patent application and that procedure is incorporated herein by reference.

The compounds of the invention have general herbicidal properties. They are especially useful in certain types of weed control such as, for example, in application to crop lands to give control of the common weeds, without harming the crop plants.

Herbicidal compositions of the invention are prepared by admixing one or more of the active ingredients defined heretofore, in herbicidally effective amounts with a conditioning agent of the kind used and referred to in the art as a pest control adjuvant or modifier to provide formulations adapted for ready and efficient application to soil or weeds (i.e., unwanted plants) using convention applicator equipment.

Thus, the herbicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean and cottonseed flours. Other inert solid conditioning agents or carriers of the kind conventionally employed in preparing pest control compositions in powdered form can be used.

Granulars can be compounded by absorbing the compound in liquid form onto a performed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac) alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15 percent by weight of the composition, and in certain compositions the percentage will be 1 percent or less. Usually, the minimum lower concentration will be 0.1 percent.

The herbicidal compositions are applied either as a spray, granular or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal compositions of the invention for selective weed control as in the control of weeds in cotton or corn fields, the compositions are preferably applied after planting of the crop seeds but before emergence of the seedlings. In other words, the applications are of the pre-emergence type.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray, dust or granular, will contain from about 0.1 to 100 percent by weight of the active compound.

Fertilizer materials, other herbicidal agents, and other pest control agents such as insecticides and fungicides can be included in the herbicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals - although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general by between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors.

The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, or sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositons of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50 percent by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc., by which the compounds and/or compositions described and claimed are prepared and/or used.

EXAMPLE 1

Preparation of
2-(3-n-pentyl-1,2,4-thiadiazolyl)-4-Methyl-1,2,4-Thiadiazolidine-3,5-Dione (Scheme A)

10 grams of 1-methyl-3(3-n-pentyl-1,2,4-thiadiazolyl) urea I were dissolved in 180 ml dry benzene at room temperature. 6.0 grams of freshly prepared chlorocarbonyl sulfenylchloride II were added dropwise with stirring. A precipitate immediately began to form. The reaction mixture was heated at reflux for 2 hours, the solid dissolved giving a clear yellow solution. After cooling to room temperature, the product was isolated via evaporation and recrystallization from benzene. The yield was 12 gms. m.p. 77°–79° C. An analytical sample gave C, 42.47; H, 5.04; N, 19.83; S, 22.17. Theory for $C_{10}H_{14}N_4S_2O_2$: C, 42.2; H, 4.90; N, 19.5; S, 22.3.

EXAMPLE 2

Preparation of Other
2-(Thiadiazolyl)-1,2,4-Thiadiazolidine-3,5-diones
(Scheme A)

These compounds were prepared in a manner analogous to Example 1 and are listed in Table I.

TABLE I

| Compound number | $R_1$ | $R_2$ | Q | Found C | H | N | Theory C | H | N |
|---|---|---|---|---|---|---|---|---|---|
| 1 | H | $CH_3$ | S | 27.35 | 2.39 | | 27.8 | 1.85 | |
| 9 | $nC_5H_{11}$ | $CH_3$ | S | 42.47 | 5.04 | 19.83 | 42.0 | 4.9 | 19.7 |
| 10 | $iC_5H_{11}$ | $CH_3$ | S | 42.74 | 5.74 | 21.47 | 42.0 | 4.9 | 19.7 |
| 20 | φ | $CH_3$ | S | 45.23 | 3.81 | 20.5 | 45.6 | 2.74 | 19.2 |

EXAMPLE 3

Preparation of
1-(3-n-Pentyl-1,2,4-Thiadiazolyl)-1,3-Diazolidine-2,4,5-Triones (Scheme B)

2.3 gms. (0.01 mole) 1-methyl-3-(3-n-pentyl-1,2,4-thiadiazolyl) urea I were added to a solution of 1.5 grams oxalyl chloride in 15 ml chlorobenzene at room temperature. This mixture was gradually heated to 110° C. After 3 hours at 110° C. the reaction mixture was poured into heptane. A solid precipitated. After recrystallization from heptane-benzene, 1.3 gms. of the product m.p. 118°–122° was obtained. An analytical sample gave C, 46.76; H, 5.42; N, 19.26. Theory for $C_{11}H_{14}N_4SO_3$: C, 46.8; H, 4.96; N, 19.85.

EXAMPLE 4
Preparation of Other 1-(1,2,4-Thiadiazolyl)-1,3-Diazolidine-2,4,5-Triones These compounds were prepared in a method analogous to that described in Example 3. These compounds are listed in Table II.

TABLE II

| Compound number | $R_1$ | $R_2$ | Q | Found C | Found H | Found N | Theory C | Theory H | Theory N |
|---|---|---|---|---|---|---|---|---|---|
| 46 | H | $CH_3$ | C=O | 34.83 | 2.22 | 25.58 | 34.2 | 1.9 | 26.4 |
| 50 | $nC_5H_{11}$ | $CH_3$ | C=O | 46.76 | 5.49 | 19.26 | 46.7 | 5.0 | 19.9 |
| 49 | $iC_5H_{11}$ | $CH_3$ | C=O | 46.6 | 5.14 | 19.95 | 46.7 | 5.0 | 19.9 |
| 53 | $\phi$ | $CH_3$ | C=O | 49.41 | 3.40 | 19.95 | 50.0 | 2.8 | 19.4 |
| 55 | $\phi CH_2$ | $CH_3$ | C=O | 52.00 | 3.60 | 18.59 | 51.9 | 3.34 | 18.5 |

The compounds made in Examples 1 through 4 were then tested for herbicidal activity. The following screening procedures were employed for testing:

Herbicides

1. Pre-Emergence
   Step 1:
   Two flats seeded with six crops (cotton, soybean, tomato, corn, rice, oats) and six weeds (mustard, morning glory, velvet leaf, crabgrass, Johnson grass, foxtail) were sprayed with a formulation containing chemical at a rate equivalent to 10 lbs./acre. The flats were then held in the greenhouse and the response rated after 12–16 days. Response was rated on a scale of 0–10, where 0 = no injury and 10 = complete kill. The results of this testing are detailed in Table III.

What is claimed is:

1. A method of combatting the growth of undesired vegetation comprising applying to said vegetation a herbicidally effective amount of a compound of the formula:

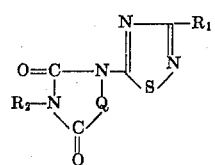

wherein $R_2$ is selected from the group consisting of hydrogen, $C_1$-$C_8$ alkyl, $C_3$-$C_8$ cycloalkyl, $C_7$-$C_{10}$ aralkyl, $C_1$-$C_4$ dialkylamino, and $C_6$-$C_{10}$ aryl optionally substituted by $C_1$-$C_4$ alkyl, $C_3$-$C_8$ alkene, $C_3$-$C_8$ alkyne, chlorine, bromine or nitro; $R_1$ is any of the members represented by $R_2$; and Q is a carbonyl group or a sulfur atom.

2. A method according to claim 1 in which the compound is 1-(3-isopropyl-1,2,4-thiadiazolyl)-3-methyl-1,3-diazolidine-2,4,5-trione.

TABLE III.—PRE-EMERGENCE TEST

| Active compounds | Applied lbs./acre | Barnyard grass | Crabgrass | Foxtail | Zinnia | Mustard | Morning glory | Cotton | Soybean | Alfalfa | Corn | Rice | Oats |
|---|---|---|---|---|---|---|---|---|---|---|---|---|---|
| 2-(3-pentyl-1,2,4-thiadiazolyl,-4-methyl-1,2,4-thiadiazolidine 3-5-dione | 10 | 6 | 8 | 10 | 10 | 10 | 8 | 0 | 0 | 10 | 0 | 0 | 0 |
| 1-(3-benzyl-1,2,4-thiadiazolyl)-3-methyl-1,3-diazolidine-2,4,5-trione | 10 | 3 | 8 | 9 | 10 | 8 | 7 | 0 | 1 | 10 | 0 | 0 | 0 |

2. Post-Emergence
   Step 1:
   Flats were seeded as above and held until the first true leaves appeared on all plants; then they were sprayed in the same fashion as above at a rate of 5 to 2.5 lbs./acre. The plant responses were rated 12–16 days after treatment on the same scale as above. The results of this testing are outlined in Table IV.

3. A method according to claim 1 in which the compound is 1-(3-methyl-1,2,4-thiadiazolyl)-3-propyl-1,3-diazolidine-2,4,5-trione.

4. A method according to claim 1 in which the compound is 2-(3-ethyl-1,2,4-thiadiazolyl)-4-methyl-1,2,4-thiadiazolidine-3,5-dione.

5. A method according to claim 1 in which the compound is 2-(1,2,4-thiadiazolyl)-4-methyl-1,2,4-

TABLE IV.—POST-EMERGENCE TEST

| Active compounds | Applied lbs./acre | Barnyard grass | Crabgrass | Foxtail | Zinnia | Mustard | Morning glory | Cotton | Soybean | Alfalfa | Corn | Rice | Oats |
|---|---|---|---|---|---|---|---|---|---|---|---|---|---|
| 2-(1,2,4-thiadiazolyl)-4-methyl-1,2,4-thiadiazolidine 3-5-dione | 5 | 4 | 7 | 6 | 6 | 5 | 5 | 4 | 5 | 10 | 2 | 1 | 1 |
|  | 2.5 | 1 | 2 | 2 | 3 | 2 | 2 | 1 | 3 | 9 | 1 | 1 | 1 |
| (1,2,4-thiadiazolyl)-3-methyl-1,3-diazolidine 2,4,5-trione | 5 | 2 | 2 | 2 | 10 | 3 | 4 | 3 | 4 | 10 | 2 | 1 | 1 |
|  | 2.5 | 1 | 1 | 1 | 7 | 1 | 2 | 5 | 3 | 2 | 1 | 0 | 0 |
| 2-(3-n-pentyl-1,2,4-thiadiazolyl)-4-methyl-1,2,4-thiadiazolidine 3-5-dione | 5 | 10 | 10 | 10 | 10 | 10 | 10 | 10 | 10 | 10 | 8 | 4 | 7 |
|  | 2.5 | 10 | 10 | 10 | 10 | 10 | 10 | 10 | 9 | 10 | 5 | 3 | 4 |
| 1-(3-pentyl-1,2,4-thiadiazolyl)-3-methyl-1,3-diazolidine-2,4,5-trione | 5 | 9 | 9 | 10 | 10 | 10 | 10 | 10 | 10 | 10 | 3 | 2 | 1 |
|  | 2.5 | 5 | 7 | 8 | 10 | 10 | 10 | 8 | 10 | 8 | 2 | 1 | 2 |
| 2-(3-isopentyl-1,2,4-thiadiazolyl)-4-methyl-1,2,4-thiadiazolidine 3-5-dione | 5 | 10 | 10 | 10 | 10 | 10 | 10 | 10 | 10 | 10 | 9 | 9 |
|  | 2.5 | 10 | 10 | 10 | 10 | 10 | 10 | 9 | 9 | 10 | 9 | 7 | 8 |
| 1-(3-isopentyl-1,2,4-thiadiazolyl)-3-methyl-1,3-diazolidine-2,4,5-trione | 5 | 10 | 10 | 10 | 10 | 10 | 10 | 9 | 9 | 10 | 3 | 8 | 3 |
|  | 2.5 | 10 | 10 | 10 | 10 | 10 | 10 | 9 | 8 | 10 | 2 | 4 | 1 |
| 1-(3-benzyl-1,2,4-thiadiazolyl)-3-methyl-1,3-diazolidine-2,4,5-trione | 5 | 9 | 9 | 10 | 10 | 10 | 10 | 9 | 3 | 10 | 6 | 7 | 6 |
|  | 2.5 | 7 | 6 | 10 | 10 | 10 | 10 | 4 | 0 | 10 | 0 | 1 | 1 | thiadiazolidine-3,5-dione.

6. A method according to claim 1 in which the compound is 2-(3-isopentyl-1,2,4-thiadiazolyl)-4-methyl-1,2,4-thiadiazolidine-3,5-dione.

7. A method according to claim 1 in which the compound is 2-(3-propyl-1,2,4-thiadiazolyl)-4-methyl-1,2,4-thiadiazolidine-3,5-dione.

8. A method according to claim 1 in which the compound is 1-(3-benzyl-1,2,4-thiadiazolyl)-3-diazolidine-2,4,5-trione.

9. A method according to claim 1 in which the compound is 2-(3-n-pentyl-1,2,4-thiadiazolyl)-4-methyl-1,2,4-thiadiazolidine-3,5-dione.

10. A method according to claim 1 in which the compound is 1-(3-pentyl-1,2,4-thiadiazolyl)-3-methyl-1,3-diazolidine-2,4,5-trione.

11. A method according to claim 1 in which the compound is 2-(3-phenyl-1,2,4-thiadiazolyl)-4-methyl-1,2,4-thiadiazolidine-3,5-dione.

12. A method according to claim 1 in which the compound is 1-(3-isopentyl-1,2,4-thiadiazolyl)-3-methyl-1,3-diazolidine-2,4,5-trione.

13. A method according to claim 1 in which the compound is 1-(3-phenyl-1,2,4-thiadiazolyl)-3-methyl-1,3-diazolidine-2,4,5-trione.

14. A method according to claim 1 in which the compound is applied by treating the soil prior to emergence of said vegetation.

15. A method according to claim 1 in which the compound is applied by treating the vegetation after its emergence from the soil.

16. A herbicidal composition comprising (1) a herbicidally effective amount of a compound of the formula:

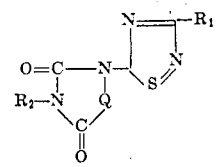

where $R_2$ is selected from the group consisting of hydrogen, $C_1$-$C_8$ alkyl, $C_3$-$C_8$ cycloalkyl, $C_7$-$C_{10}$ aralkyl, $C_1$-$C_4$ dialkylamino, and $C_6$-$C_{10}$ aryl optionally substituted by $C_1$-$C_4$ alkyl, $C_3$-$C_8$ alkene, $C_3$-$C_8$ alkyne, chlorine, bromine or nitro; $R_1$ is any of the members represented by $R_2$; and Q is a carbonyl group or a sulfur atom, and (2) an agriculturally acceptable carrier.

17. A composition to claim 16 in which the compound is 2-(3-n-pentyl-1,2,4-thiodiazolyl)-4-methyl-1,2,4-thiodiazolidine-3,5-dione.

* * * * *